Oct. 10, 1944.  K. O. AINSLIE ET AL  2,360,093
PUMP FOR DELIVERING MEASURED VOLUMES OF LIQUID UNDER PRESSURE
Filed Oct. 23, 1943
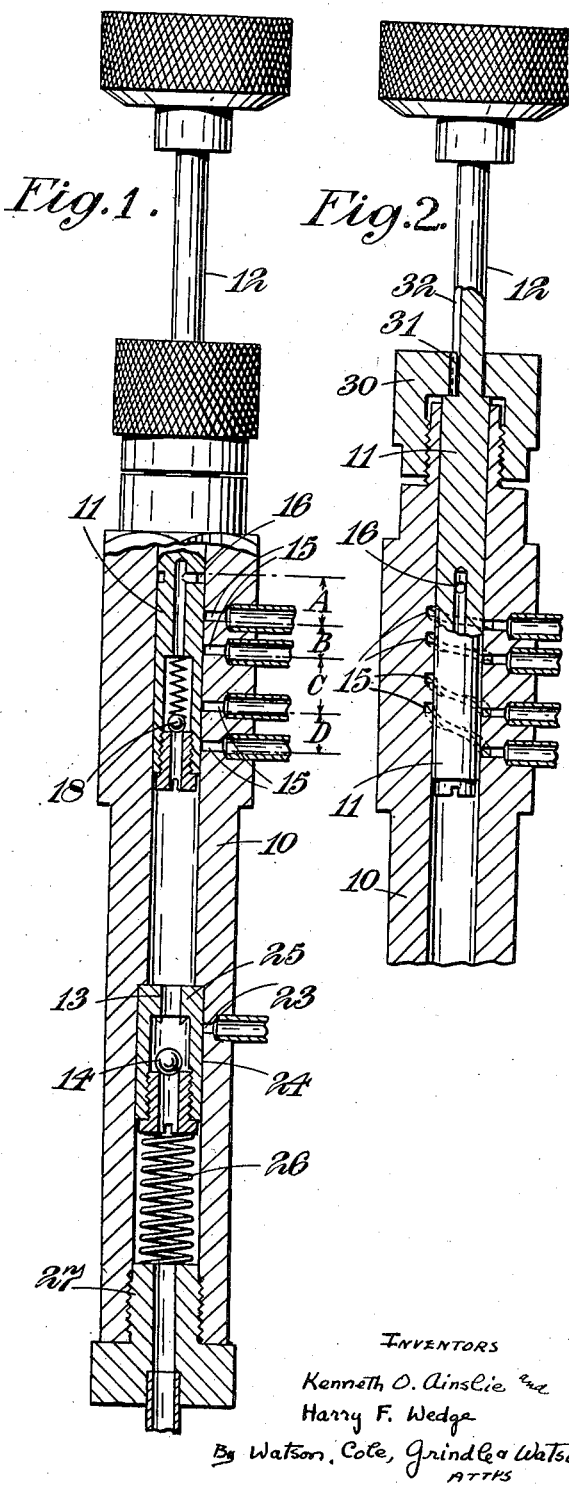
Inventors
Kenneth O. Ainslie and
Harry F. Wedge
By Watson, Cole, Grindle & Watson
Attys Patented Oct. 10, 1944

2,360,093

UNITED STATES PATENT OFFICE 2,360,093

PUMP FOR DELIVERING MEASURED VOLUMES OF LIQUID UNDER PRESSURE

Kenneth Oliver Ainslie, Welwyn Garden City, and Harry Frederick Wedge, Knebworth, England Application October 23, 1943, Serial No. 507,440 In Great Britain June 1, 1942

5 Claims. (Cl. 103—2)

This application corresponds to the application of Kenneth Oliver Ainslie and Harry Frederick Wedge, Serial No. 7,407/42, which was filed in Great Britain on June 1, 1942.

This invention relates to pumps for delivering measured quantities of liquid under pressure and has for its object to provide a pump that will deliver a measured quantity of liquid to each of a number of points during one stroke of the pump.

According to the present invention a pump for liquids comprises a cylinder having a series of outlet ports, a piston movable into the cylinder and valve means operable in synchronism with the piston to open the outlet ports in succession and each at a predetermined point in the stroke of the piston and to close each port when or before it opens the next in the series.

Preferably the valve means is constituted by the piston which is formed with a port to communicate with the outlet ports in succession as the piston moves and a passage connecting the piston port to the interior of the cylinder. Preferably a non-return valve is provided in said passage to prevent flow of liquid from the outlet ports back to the cylinder.

In one construction according to this invention the axial length of each port, in the direction of the axis of the cylinder, is proportional to the volume of liquid to be delivered through it on each stroke of the piston and the ports are axially spaced by lands of which the axial dimension is approximately the same as that of the piston port. Preferably there is provided a relief valve for opening the cylinder to drain when the pressure in the cylinder exceeds a predetermined pressure.

In an alternative construction each outlet port is closed before the next in the series is opened and there is provided a chamber communicating with the cylinder and having a wall movable against the load of a spring to increase the volume of the chamber. Conveniently the said wall is a follower piston loaded to move into the chamber by a spring. There may be provided a port in the chamber which is normally covered and closed by the follower piston but which is uncovered by the follower piston and opened when the volume of liquid in the chamber exceeds the minimum volume of the chamber by more than the maximum volume that is to be delivered to any outlet port in a single stroke of the main piston, so that the follower piston acts also as a relief valve.

Two pumps embodying this invention will now be described, by way of example only, with reference to the accompanying drawing, in which—

Figure 1 is an axial section through the pump, and

Figure 2 shows a modification of the pump shown in Figure 1.

Like reference numerals indicate like parts in both the figures of the drawing.

The two pumps illustrated are intended for use in delivering a measured quantity of oil to each of a number of points to be lubricated in a single reciprocation of the pump, but the pumps may be used for many other purposes.

As shown in Figure 1, the pump comprises a cylinder 10 and a piston 11 that can be reciprocated in the cylinder by a rod 12 operated by hand or mechanically in any suitable way. As the piston moves up in the cylinder, it draws oil in through an inlet port 13 that is controlled by a non-return valve 14.

The cylinder is formed with a series of outlet ports 15 which are opened in succession by the movement of the piston which is formed with an annular port 16 and a passage leading from this port through the piston and opening into the working chamber of the cylinder. The piston thus acts also as a valve. A non-return valve 18 is provided in this passage to prevent oil flowing through it back into the cylinder.

The outlet ports 15 are all of the same axial length and are spaced from the top position of the piston port 16 and from one another by distances, A, B, C, D proportional to the volumes to be delivered through them. The lower part of the cylinder 10 is enlarged to form a chamber 24 in which a follower piston 25 fits. This piston forms a movable wall of the chamber by which the volume of the chamber can be varied and is loaded by a spring 26. The spring 26 abuts against a plug 27 screwed into the open end of the chamber and is pre-loaded to hold the piston 25 in the position shown until the pressure in the cylinder 10 exceeds that at which delivery is required to take place.

As the main piston 11 is moved down, it forces the oil into the chamber 24, the piston 25 moving into the chamber, at a pressure determined by the pre-loading of the spring 26. When the piston port 16 registers with the top outlet port 15, the piston 25 is moved up by its spring 26 to deliver a volume of oil equal to that in the chamber 24 through the top port 15. This is repeated for each other port.

The inlet port 13 and its non-return valve 14 are provided in the piston 25. A drain passage 23 is provided from the chamber 24 but is so positioned that it is covered by the piston 25 in any position the piston would normally assume. If, however, delivery through any of the ports 15, except the lowest, is prevented, two measured volumes of oil will be forced into the chamber 24 and the piston 25 will move far enough to uncover the passage 23 so that some oil will escape. The piston 25 thus serves the purpose of a relief valve, as well as its main function. The passage 23 preferably communicates with a glass tube or similar device so that the escape of oil through the relief valve can be seen and the obstruction to the delivery of the oil through one of the outlet ports 15 that cause this escape can be traced and rectified.

It will be seen that the piston 11 serves to meter the liquid to be delivered to each outlet port while the piston 25 effects the delivery. The construction has the advantage over known constructions that it delivers the liquid at a predetermined pressure so that there is no risk of the liquid being forced into a stopped delivery conduit with consequential risk of damage. Moreover, different deliveries to the different conduits can be obtained simply and cheaply by drilling the ports 15 at the correct spacing.

Figure 2 shows a modification of the pump shown in Figure 1 to allow of the delivery to each point being adjusted. For this purpose, the piston port 16 is formed as a circular hole and each outlet port is formed as a helical slot in the cylinder barrel, the inclination of the slots increasing progressively so that they approach one another and their spacing varies progressively round the cylinder. The variation of the delivery is effected by rotating the piston 11 to bring its port 16 into a line on which the ports 15 are more widely spaced or more closely spaced. The rotation of the piston may be effected in any convenient manner. As shown, a cap 30 on the cylinder has a key 31 engaged in a key-way 32 on the piston rod 12 and the piston is adjusted about its axis by turning the cap 30.

We claim:

1. A pump for liquids comprising a cylinder formed with an inlet port and a series of outlet ports spaced apart lengthwise of the cylinder, a piston reciprocal in the cylinder so as always to isolate the outlet ports from the interior of the cylinder and formed with a port communicating with the interior of the cylinder and registering with each outlet in succession as the piston is moved into the cylinder, a chamber communicating with the interior of the cylinder but forming no part thereof and having a movable wall whereby its volume is variable and a spring biassing said wall to move to reduce the volume of the chamber to a minimum.

2. A pump for liquids comprising a cylinder having an inlet port controlled in a non-return valve and a series of outlet ports spaced apart lengthwise of the cylinder, a piston so reciprocal in the cylinder as at all times to cover the outlet ports, and formed with a port in the piston to register with each outlet port in succession as the piston is reciprocated and of such dimensions as to register with a single port only and also formed with a passage through which the port in it communicates with the interior of the cylinder, a chamber communicating with the interior of the cylinder but forming no part of the volume of the cylinder swept by the piston, a follower piston reciprocal in the chamber and a spring loading said piston to move into the chamber.

3. A pump according to claim 2, comprising a non-return valve in said passage to prevent flow of liquid through said passage towards the interior of the cylinder.

4. A pump according to claim 2, wherein the chamber is formed with a port which is normally covered and closed by the follower piston but which is uncovered by the follower piston and opened when the volume of liquid in the chamber exceeds the minimum volume of the chamber by more than the maximum volume which is swept by the piston in its movement to bring the port in it from register with any one outlet port to the following outlet port.

5. A pump for liquids comprising a cylinder having a portion of narrow bore and a portion of larger bore, a piston within the portion of larger bore, a spring loading said piston to hold it against the step formed by the transition from the narrow bore to the larger bore, an inlet port controlled by a non-return valve for admitting liquid to the narrow bore of the cylinder at a point adjacent its transition to the wider bore, a series of outlet ports spaced apart lengthwise of the cylinder and opening into the narrow bore of the cylinder at a point remote from the inlet port, a plunger reciprocal in the narrow bore of the cylinder and at all times covering the outlet ports, a port formed in the plunger to register with the outlet ports in succession and one only at a time, a passage extending through the plunger through which the port therein opens into the interior of the cylinder and a non-return valve in said passage to permit flow from the interior of the cylinder in the port but not in the reverse direction.

KENNETH OLIVER AINSLIE.
HARRY FREDERICK WEDGE.